US008083332B2

(12) United States Patent
Price et al.

(10) Patent No.: US 8,083,332 B2

(45) Date of Patent: Dec. 27, 2011

(54) DUAL SEATING QUICK CONNECT VALVE

(75) Inventors: Brian G. Price, Pittsford, NY (US); David R. Scott, Brockport, NY (US)

(73) Assignee: Eastman Kodak Company, Rochester, NY (US)

( * ) Notice: Subject to any disclaimer, the term of this patent is extended or adjusted under 35 U.S.C. 154(b) by 972 days.

(21) Appl. No.: 12/040,048

(22) Filed: Feb. 29, 2008

(65) Prior Publication Data

US 2009/0219353 A1 Sep. 3, 2009

(51) Int. Cl.
*B41J 2/175* (2006.01)
*F16K 21/04* (2006.01)

(52) U.S. Cl. .......................................... 347/84; 137/543

(58) Field of Classification Search .................... 347/84, 347/85, 86; 137/542, 543, 843, 852; 251/359, 251/364, 365

See application file for complete search history.

(56) References Cited

U.S. PATENT DOCUMENTS 3,779,276 A 12/1973 King, Sr.
3,941,149 A 3/1976 Mittleman
4,677,447 A 6/1987 Nielsen
5,027,784 A * 7/1991 Osawa et al. ................ 123/572
5,067,449 A * 11/1991 Bonde ........................ 123/41.86
5,842,682 A 12/1998 Schennum et al.
6,039,441 A 3/2000 Tomikawa et al.
6,651,955 B2 11/2003 Anderson
6,802,601 B2 * 10/2004 Suzuki et al. .................. 347/86
7,082,967 B2 8/2006 Sarajian et al.
7,434,923 B2 * 10/2008 Miyazawa et al. ............. 347/86
7,726,335 B2 * 6/2010 Doble .......................... 137/542
2001/0006396 A1 7/2001 Iida
2006/0130917 A1 6/2006 Myntti

* cited by examiner

*Primary Examiner* — Anh T. N. Vo

(74) *Attorney, Agent, or Firm* — William R. Zimmerli; Peyton C. Watkins

(57) ABSTRACT

A valve includes a stem, a cap, and a deformable lip. The stem includes a first sealing portion and has a longitudinal axis. The cap is connected to the stem and includes a passageway. The deformable lip extends from a periphery of the cap and includes a second sealing portion. The stem is displaceable relative to the deformable lip along the longitudinal axis of the stem to open the first sealing portion and close the second sealing portion to allow fluid to move through the passageway in the cap.

18 Claims, 7 Drawing Sheets

DUAL SEATING QUICK CONNECT VALVE

FIELD OF THE INVENTION

The invention relates generally to the field of fluid flow, and in particular to elastomeric valves.

BACKGROUND OF THE INVENTION

Numerous applications exist where the regulation of fluid flow through an orifice is required. Such applications can be relatively basic such as containing a fluid in an enclosure until it is intended for some use while others can be complicated such as in an apparatus or process used in a medical, industrial or automotive application, just to name a few. The typical name for a component which regulates fluid flow is a valve and nearly all valves have two principal functions. The first function is stop fluid flow through an orifice without causing any leakage past the valve and the second function is to allow the liquid to flow freely through the orifice upon actuation of the valve.

Traditionally, the regulation of fluid flow has been accomplished using various valve designs. A number of known valve designs include, ball valves, poppet valves, flapper valves, duckbill valves and umbrella valves. Valves of these types have a common feature in that they restrict fluid flow until the fluid pressure reaches a sufficiently high value to deform part of the valve or to move the valve away from the orifice through which the fluid flows. In the case of an umbrella valve or flapper valve, fluid reaches a high enough pressure to deform the flaps of the umbrella or flapper portion and fluid flows through holes in the container wall. In the case of a duckbill valve a portion of the valve pinches together to close the valve until the fluid reaches a high enough pressure to open the pinch point and then fluid flows through the valve itself. In the case of a ball valve or poppet valve an obstructing portion of the valve seats against the orifice until the fluid pressure is high enough to displace the ball, or spring loaded ball from the orifice.

Valves of the type where liquid pressure actuates the valve to allow fluid flow often suffer from limitations in their ability to seal an orifice from leakage and are, by design, not able to stop fluid flow under some critical level of fluid pressure. A further limitation of the known valve designs is that fluid can only flow past or through the valve in the one direction that the fluid is moving.

One application where the valve of the present invention is particularly useful is in the case of an ink container for an inkjet printer. An ink container must hold ink within the container without leakage during periods of storage and shipping even when the fluid within the chamber experiences substantial changes in pressure. At the same time, the ink container must have an orifice through which ink can be delivered to the printhead during the printing operation. Additionally, an ink container can be installed and removed a number of times from the printer during its useful lifetime and a means for rapidly disconnecting and reconnecting the container without loss of contents or function of the container would be beneficial.

There remains a need for a valve that can regulate flow fluid through an orifice whereby the valve permits an excellent seal for the orifice so that no liquid leaks around or through the valve until the valve is actuated to allow fluid flow through the orifice. Additionally, there is a need for a valve which can be repeatedly and quickly actuated in a simple manner thereby allowing fluid to flow easily through an orifice.

SUMMARY OF THE INVENTION

The present invention is directed to overcoming one or more of the problems associated with currently known valves set forth above. Briefly summarized, according to one aspect of the present invention, is provided an elastomeric valve having a dual seating feature for improved sealing of an orifice when the valve is in a closed state. The fluid valve maintains a positive seal and prevent fluid flow until actuated by a means such as a mechanical force which displaces a portion of the valve in an axial direction thereby allowing free fluid flow in either direction through the valve. The valve returns to its original closed state once the means for actuating the valve are removed, resulting in a quick connecting valve that can be repeatedly opened and closed in a simple and efficient manner.

According to another aspect of the invention, a valve includes a stem, a cap, and a deformable lip. The stem includes a first sealing portion and has a longitudinal axis. The cap is connected to the stem and includes a passageway. The deformable lip extends from a periphery of the cap and includes a second sealing portion. The stem is displaceable relative to the deformable lip along the longitudinal axis of the stem to open the first sealing portion and close the second sealing portion to allow fluid to move through the passageway in the cap.

According to another aspect of the invention, an apparatus for storing fluid includes a container and a valve. Portions of the container define an orifice. The valve is seated in the orifice. The valve includes a stem, a cap, and a deformable lip. The stem includes a first sealing portion and has a longitudinal axis. The cap is connected to the stem and includes a passageway. The deformable lip extends from a periphery of the cap and includes a second sealing portion. The stem is displaceable relative to the deformable lip along the longitudinal axis of the stem to open the first sealing portion and close the second sealing portion to allow fluid to move through the passageway in the cap.

According to another aspect of the invention, a method of controlling fluid flow includes providing a container, portions of the container defining a hole; providing a valve seated in the hole, the valve including: a stem including a first sealing portion, the stem having a longitudinal axis; a cap connected to the stem, the cap including a passageway; and a deformable lip extending from a periphery of the cap, the deformable lip including a second sealing portion, the stem being displaceable relative to the deformable lip along the longitudinal axis of the stem to open the first sealing portion and close the second sealing portion to allow fluid to move through the passageway in the cap; and displacing the stem relative to the deformable lip along the longitudinal axis of the stem to open the first sealing portion and close the second sealing portion causing fluid to move through the passageway in the cap.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

DETAILED DESCRIPTION OF THE INVENTION

Valves of the present invention are made from elastomeric materials and in particular thermoplastic elastomeric polymers. Elastomeric polymers useful in the present invention include those selected from the non-exhaustive list consisting of, polyisoprene, polybutadiene, polychloroprene, polyisobutylene, poly(styrene-butadiene-styrene), polyurethanes, silicones, poly(bis(fluoroalkoxy)phosphazene) (PNF, Eypel-F), poly(carborane-siloxanes) (Dexsil), poly(acrylonitrile-butadiene) (nitrile rubber), poly(1-butene), poly(chlorotrifluoroethylene-vinylidene fluoride) copolymers (Kel-F), poly (ethyl vinyl ether), poly(vinylidene fluoride), poly (vinylidene fluoride-hexafluoropropylene)copolymer (Viton), elastomeric compositions of polyvinylchloride (PVC), polysulfone, polycarbonate, polymethylmethacrylate (PMMA), and polytertrafluoroethylene (Teflon), or combinations thereof. It is possible to crosslink the elastomeric polymers using known crosslinking chemistries. The valve can also include a combination of elastomeric polymer and a diluting or doping additive which can act to adjust the deformation properties of the valve. The additives can be, for example a non elastomeric polymer or a plasticizer.

Figure 1:
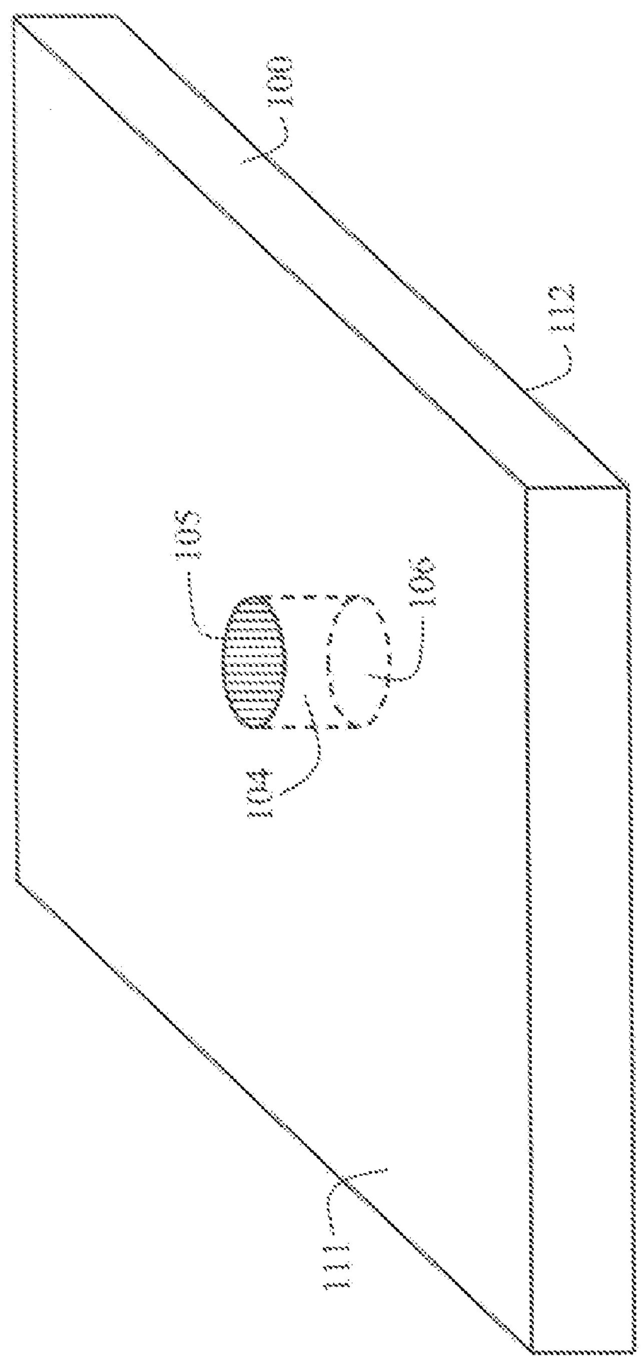
FIG. 1 is a top perspective view of an exemplary embodiment of an opening in a body for use with the valve of the present invention.

The specific configuration of the valve of the present invention (either in its deformed state or in its undeformed state) will depend upon the geometry of the surfaces against which the valve is required to seal. FIG. 1 shows a top perspective view of a first exemplary body 100 in which the valve of the present invention can be used. Body 100 has a first flat surface 111, an opposing second flat surface 112, and a hole 104 that passes through body 100. Hole 104 intersects first surface 111 at orifice 105, and hole 104 intersects second surface 112 at orifice 106. In this example, a bottom perspective view of body 100 would look similar to the top perspective view of FIG. 1.

Figure 2:
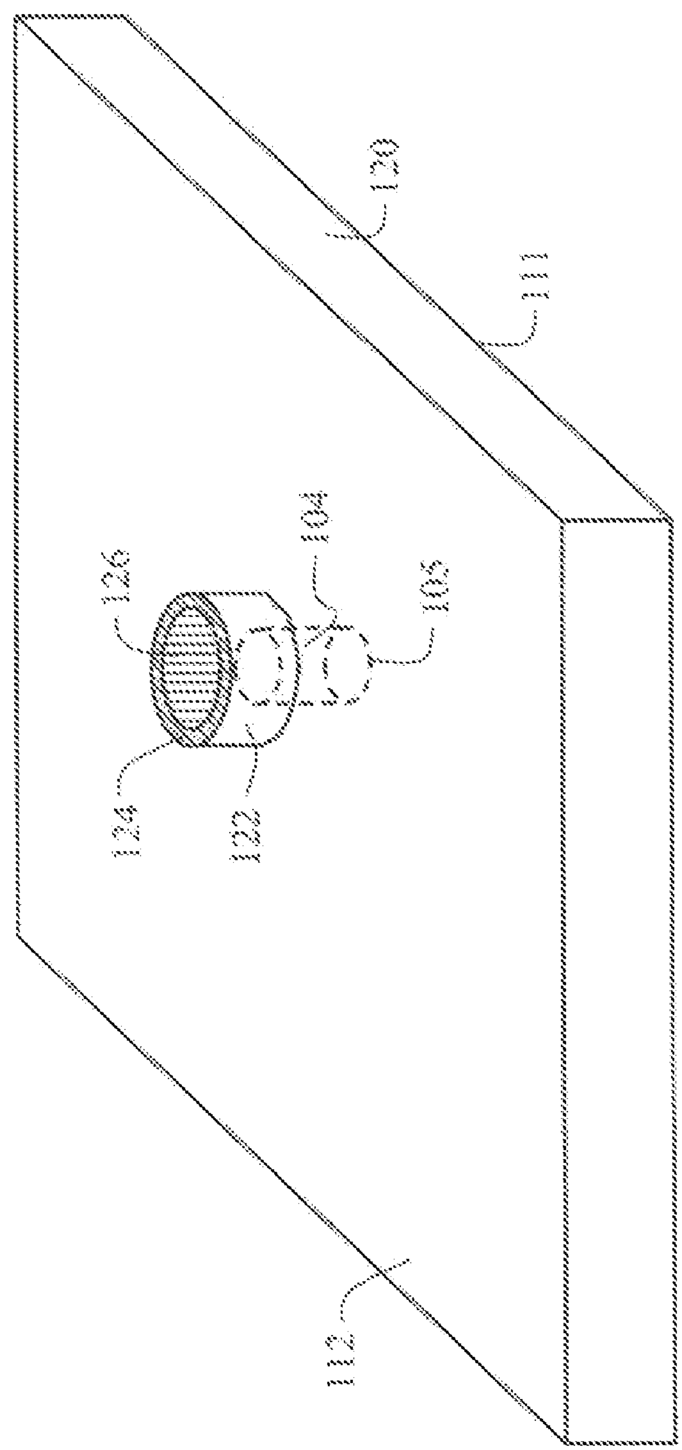
FIG. 2 is a bottom perspective view of a second exemplary embodiment of an opening in a body having a portion extending from the body for use with the valve of the present invention.

FIG. 2 shows a bottom perspective view of a second exemplary body 120 in which the valve of the present invention can be used. Body 120 has a first flat surface 111, an opposing second surface 112, a tubular portion 122 extending from second surface 112, and a hole 104 that passes through both the thickness of body 120 and also through tubular portion 122. Tubular portion 122 terminates at rim 124 and orifice 126. Orifice 105 is the intersection of hole 104 and first surface 111, while orifice 126 is the termination of hole 104 at tubular portion 122.

The valve 10 of the present invention shown in the exemplary embodiments of FIGS. 3-7 comprises a stem 11 and a cap 20. The stem 11 includes a first sealing portion 12, and cap 20 includes a deformable lip 22. When the valve 10 is inserted into an orifice or hole, a first sealing portion 12 of valve 10 prevents leakage of a fluid through the orifice when the valve is in a closed state. In some example embodiments, the stem 11 is substantially straight (i.e., a substantially right-circular cylindrical stem) having one end attached to the first sealing portion 12 and the other end attached to a cap 20. The first sealing portion 12 extends radially from the stem 11. In another example embodiment, the first sealing portion 12 extends radially from the stem 11 and is more rigid than the deformable lip 22. The first sealing portion 12, extending radially from the stem 11 can be made more rigid than the deformable lip 22 by modifying the properties of the elastomer in the respective portions of the valve 10. The first sealing portion 12 can also be attached to the stem 11 and can be formed from a relatively non-deformable material when compared to the stem and deformable lip 22.

The first sealing portion 12 extending radially from the stem 11 can have a geometry that makes the member more rigid than the deformable lip 22. The first sealing portion 12 can have one or more ridges, tapers, threads or other geometric shapes that render the stem 11 more rigid than the deformable lip 22. For example, in FIG. 3, first sealing portion 12 includes tapered surface 15 that increases rigidity (compared to valves that don't have a tapered surface) and facilitates insertion of valve 10 through hole 104. The first sealing portion 12 has a diameter that is greater than the diameter of the stem 11 and the diameter of the first sealing portion 12 is less than the diameter of the deformable lip 22.

The stem 11 of the valve 10 has a longitudinal axis 13 along which the stem can be displaced in order to actuate fluid flow through the valve. The stem 11 can include at least one passageway 30 extending through an interior of the stem and having a first opening 31 in the side of the stem and a second opening 32 in the cap 20 as exemplified by FIG. 3. The second opening 32 in the cap 20 can be located on any portion of the cap which allows fluid to flow through the cap and can be on the bottom or side of the cap. The first opening 31 in the side of the stem 11 is typically located at a distance below the first sealing portion 12 such that no liquid can flow through the orifice unless the stem is displaced along the longitudinal axis 13. This ensures that no fluid can leak past the first sealing portion 12. The first opening 31 in the side of the stem 11 is typically located at a distance above the cap 20 such that when the stem is displaced along the longitudinal axis 13 the first opening 31 in the side of the stem is displaced to a position at or above the orifice. This allows unobstructed open fluid communication through the valve 10 in either direction through the at least one passageway 30. The at least one passageway 30 can be spaced apart in any arrangement about the stem 11 and more than one passageway can be present each having a first and second opening 31 and 32 usable to allow fluid flow through the valve 10.

The valve 10 of the present invention includes a cap 20 that is connected to the stem 11. The cap 20 can be made from the list of elastomeric materials above, or other suitable materials, and typically the cap is more deformable than the first sealing portion 12 of the stem 11 by material selection or geometry. The cap 20 can also be made from a relatively non-deformable material and can be made from the same material as the rigid first sealing portion 12. The cap 20 includes a deformable lip 22 extending from the periphery of the cap. In one embodiment, the deformable lip 22 extends radially from the periphery of the cap 20. The deformable lip 22 can seat against the surfaces 111 or 112 of the body 100 or 120 and can act to hold the valve 10 in place while the valve is in a closed state. Typically, the diameter of the deformable lip 22 is greater than the diameter of the first sealing portion 12.

The deformable lip 22 includes a second sealing portion 23. The second sealing portion 23 can be an upper or lower portion of the deformable lip 22 and will depend on the geometry of the orifices which are to be sealed by the valve.

Figure 3:
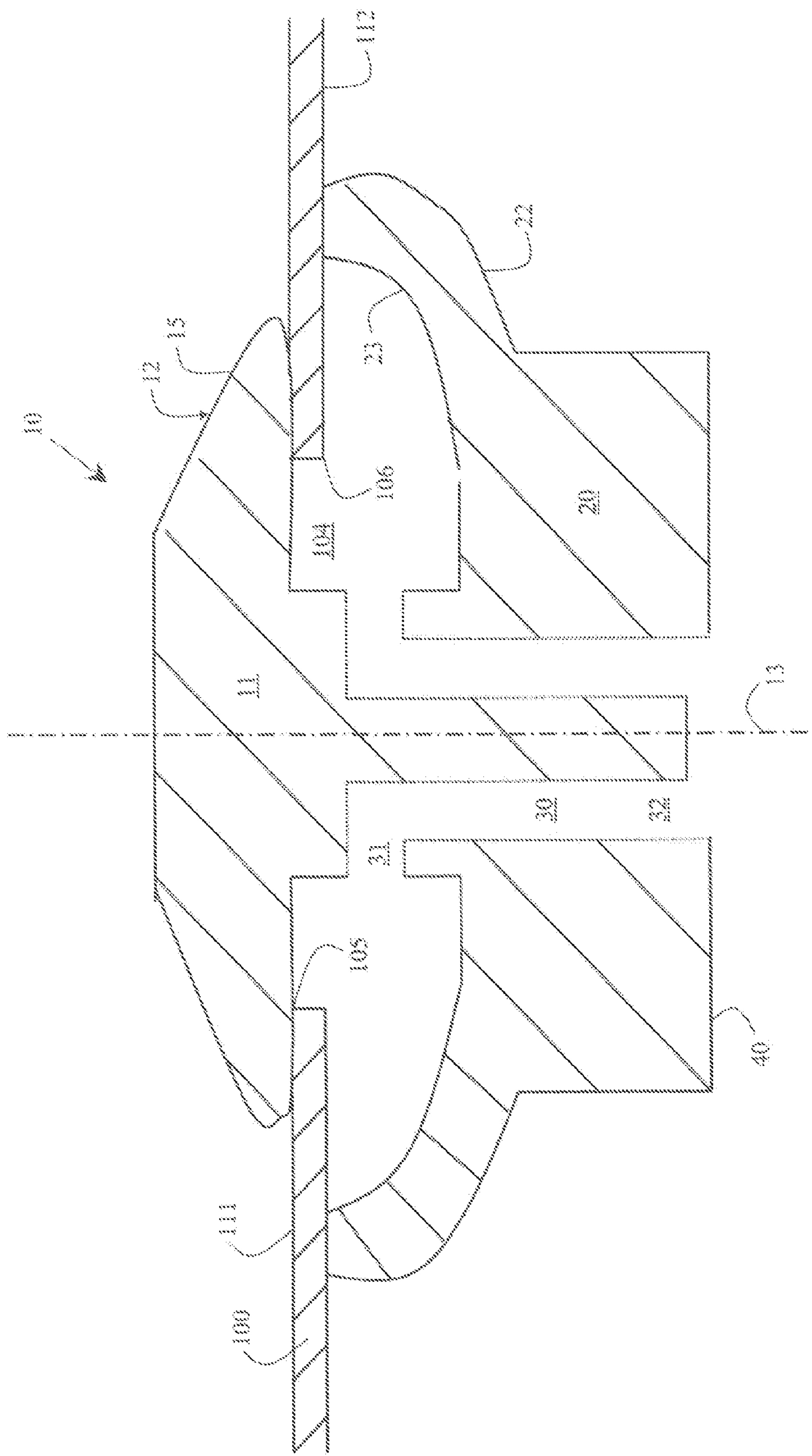
FIG. 3 is a cross-sectional view of an exemplary embodiment of an elastomeric valve of the present invention where the valve is in a closed position.
Figure 4:
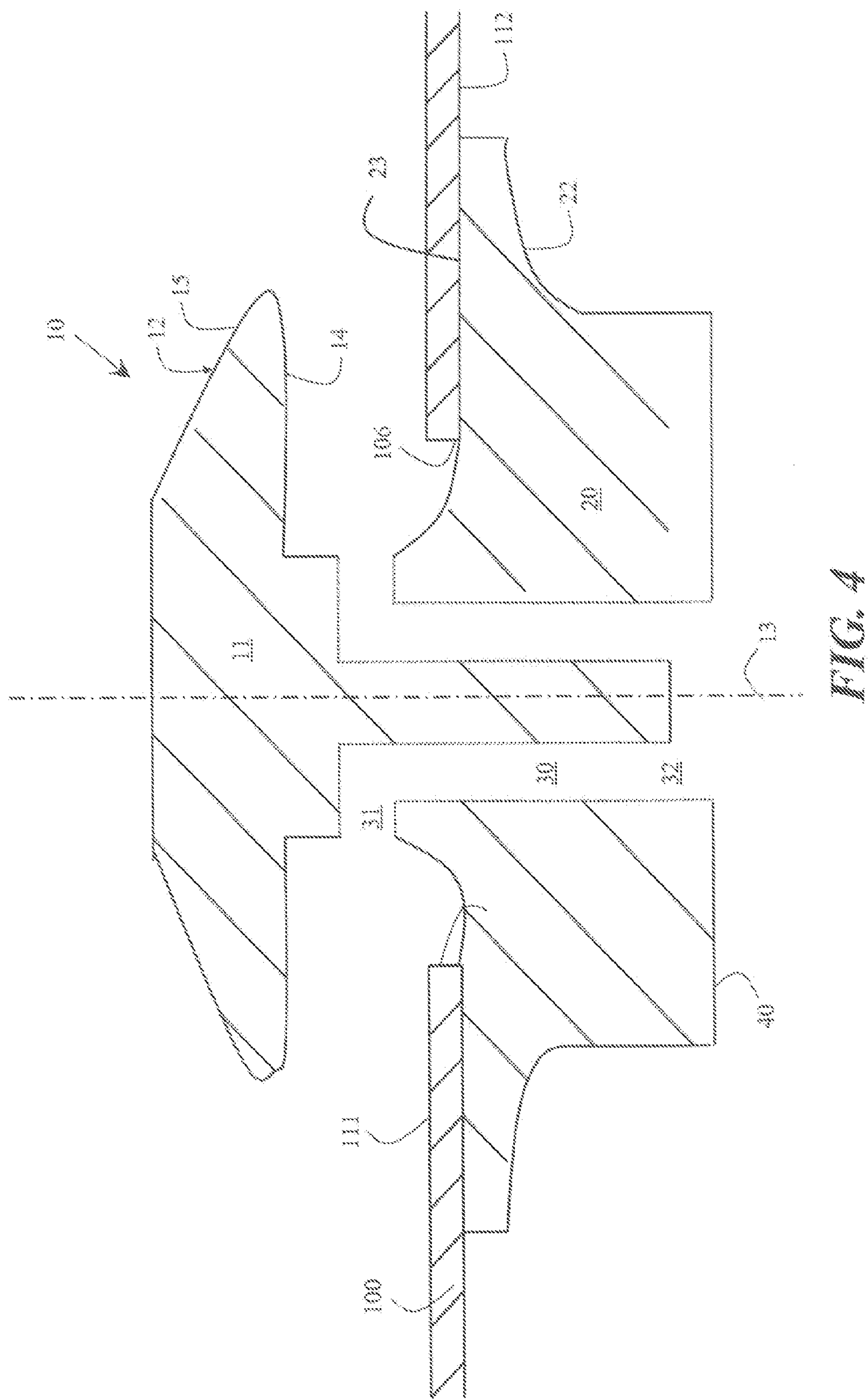
FIG. 4 is a cross-sectional view of a exemplary embodiment of an elastomeric valve of the present invention where the valve is in an open position.

In one embodiment, exemplified by FIG. 3, corresponding to a body of the type shown in FIG. 1 (which can be, for example, a wall of a container), the sealing surface 14 of first sealing portion 12 seals against top surface 111 around orifice 105 in body 100. Second sealing portion 23 is located along the top surface of the lip 22 and is not sealingly engaged in FIG. 3. When the stem 11 is forcibly displaced along the longitudinal axis 13 and relative to the deformable lip 22, as shown in FIG. 4, the sealing surface 14 of first sealing portion 12 moves away from surface 111 of body 100 so that it is no longer sealed, while the second sealing portion 23 forms a tight seal between an inner surface of the deformable lip 22 and surface 112 of body 100 around orifice 106. The displacement of the stem 11 relative to the deformable lip 22 simultaneously opens the first sealing portion 12 and closes the second sealing portion 23 thereby allowing open fluid flow through the at least one passageway 30 and the orifice. The displacement of the stem 11 relative to the deformable lip 22 creates a restoring force against the axial displacement of the stem such that when the displacement force is removed the restoring force acts to close the first sealing portion 12 and open the second sealing portion 23 thereby returning the valve to the original closed position.

Figure 5:
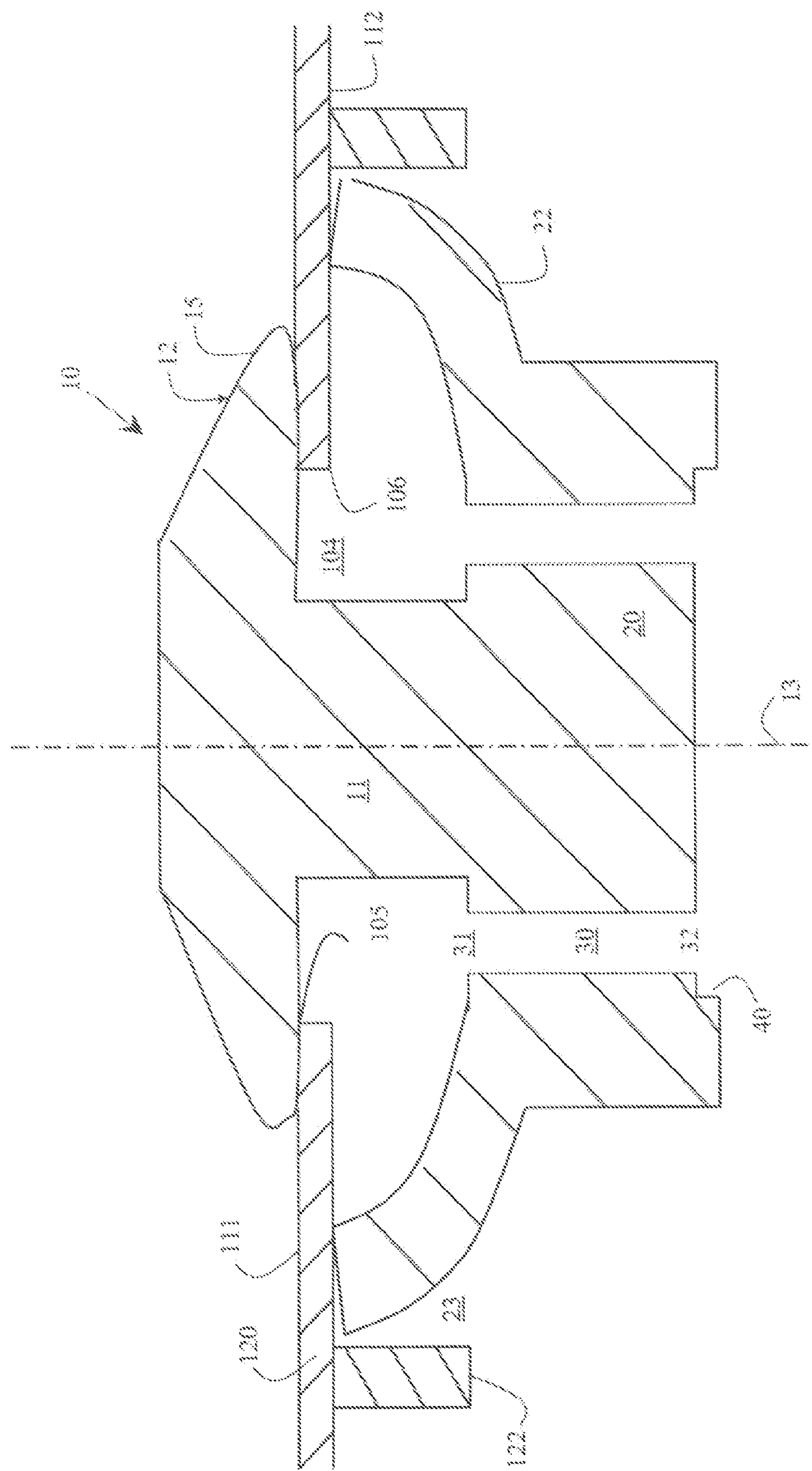
FIG. 5 is a cross-sectional view of a second exemplary embodiment of an elastomeric valve of the present invention where the valve is in a closed position.
Figure 6:
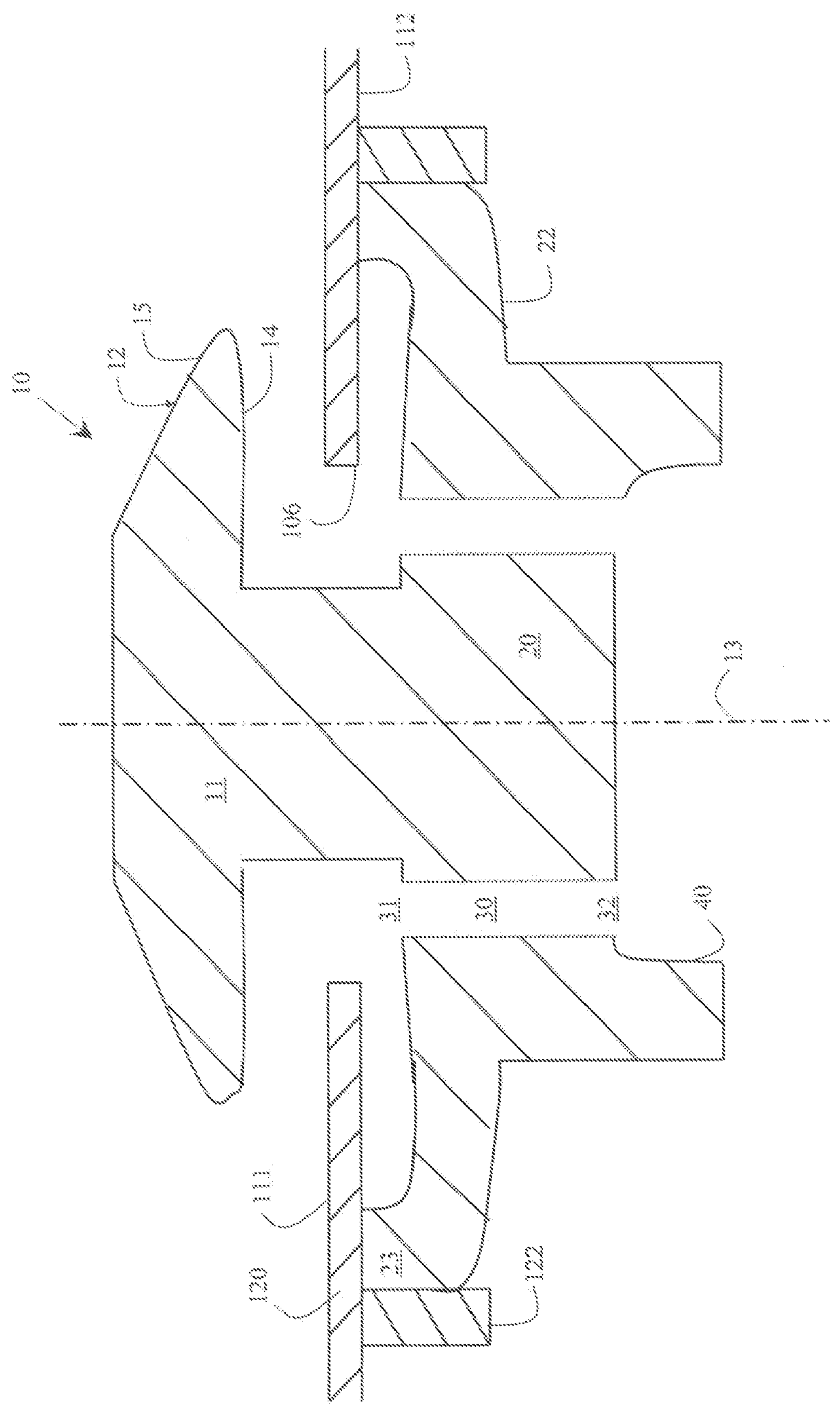
FIG. 6 is a cross-sectional view of a second exemplary embodiment of an elastomeric valve of the present invention where the valve is in an open position.
Figure 7:
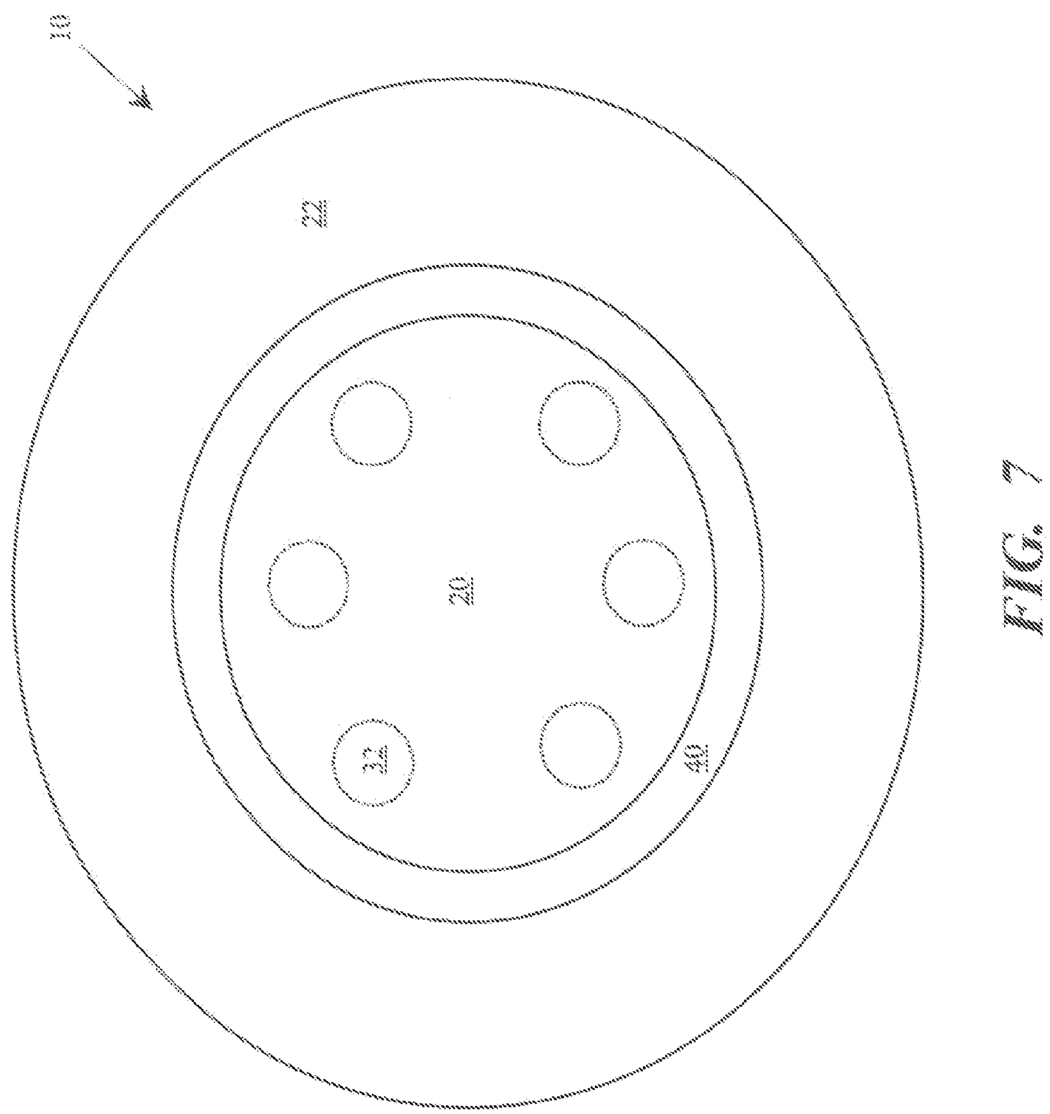
FIG. 7 is a bottom view of the valve of FIG. 1.

The deformable lip 22 can also include a second sealing portion 23 which is located on the bottom of the deformable lip as exemplified by FIG. 5. When the stem 11 is forcibly displaced along the longitudinal axis 13 and relative to the deformable lip 22, as shown in FIG. 6, the second sealing portion 23 forms a tight seal between an outer surface of the deformable lip and the inside of tubular portion 122. In FIG. 6, tubular portion 122 extends outwardly from surface 112 of body 120. Again, the displacement of the stem 11 relative to the deformable lip 22 simultaneously opens the first sealing portion 12 by displacing sealing surface 14 from surface 111 and closes the second sealing portion 23 and creates a restoring force allowing the valve to be repeatedly opened and closed.

In one embodiment of the present invention, exemplified in FIG. 5, the cap 20 can include at least one passageway 30 extending through an interior of the cap and having a first opening 31 in the top of the cap and a second opening 32 in the bottom or side of the cap. The at least one passageway 30 is located at a distance from the center of the cap 20 that is less than the distance from the center of the stem 11 to the outermost distance of the first sealing portion 12. This arrangement allows for optimal fluid flow through the passageway 30 once the stem 11 is displaced along the longitudinal axis 13. However, other arrangements are permitted depending on the specific applications contemplated.

The cap 20 can include a third sealing portion 40. The third sealing portion 40 is spaced apart from the second sealing portion 23 and is engageable when during axial displacement of the stem 11 relative to the deformable lip 22. In one example embodiment, the third sealing portion 40 is formed on a bottom portion of the cap 20 (as in FIGS. 3 and 4). Alternatively, the third sealing portion 40 can protrude from the bottom of the cap 20 and form a surface (as in FIGS. 5 and 6) that can seal against the outer circumference of a tube or pipe (not shown) that is capable of transferring fluid to or from the valve 10. Alternative sealing portions, such as one or more grooves, threads or depressions machined into the cap 20 could serve to engage the means for axial displacement.

Axial displacement of the stem 11 along the longitudinal axis 13 relative to the deformable lip 22 of the cap 20 can be accomplished by any means that does not impede the basic function of the valve 10. Axial displacement of the stem 11 can be accomplished by a pulling force on the top of the stem. This allows for arrangements where a connection is attached to, or part of the stem 11 itself. Alternatively, the axial displacement of the stem 11 can be accomplished by pushing from the bottom of the cap 20. A tube, pipe or other conduit can directly interface to the third sealing portion 40 or an intermediate component such as a spring or mechanical actuator can interface at the bottom portion of the cap 20. Under certain circumstances, axial displacement of the stem 11 can also be accomplished by a substantial fluid pressure at the bottom portion of the cap 20 in the direction of the stem.

FIGS. 3 and 5 exemplify an embodiment of the present invention where the valve 10 is seated in an orifice that defines a container useful as an ink cartridge in an inkjet printer. The hole 104 exemplifies a supply port in the wall of an inkjet cartridge useful for providing ink from the cartridge to the printhead component of the printer. FIGS. 3 and 5 exemplify the condition where the ink cartridge is not connected to the printer. In this condition, the valve 10 is in a closed position and prevents leakage of ink from the cartridge during storage and shipping. FIGS. 4 and 6 exemplify an embodiment of the present invention where the ink cartridge comprising the valve 10 is connected to a component of the printer which axially displaces the stem 11 relative to the deformable lip 22 along the longitudinal axis 13, such as a supply conduit to an inkjet printhead. This provides a condition where ink stored in the ink cartridge can readily flow through the at least one passageway 30 of the valve 10 and through the orifice thereby providing an efficient means of delivering ink from the cartridge to the printhead. Removal of the ink cartridge from the supply conduit allows the restoring force, actuated by the axial displacement of the stem 11 relative to the deformable lip 22, to close the valve 10.

The invention has been described with reference to one or more example embodiments. However, it will be appreciated that variations and modifications can be effected by a person of ordinary skill in the art without departing from the scope of the invention.

PARTS LIST 10 valve
11 stem
12 first sealing portion
13 longitudinal axis
14 sealing surface
15 tapered surface
20 cap
22 deformable lip
23 second sealing portion
30 passageway
31 first opening
32 second opening
40 third sealing portion
100 body
104 hole
105 orifice
106 orifice
111 first surface

112 second surface
120 body
122 tubular portion
124 rim
126 orifice

The invention claimed is:

1. A valve comprising:

a stem including a first sealing portion, the stem having a longitudinal axis;

a cap connected to the stem, the cap including a passageway; and a deformable lip extending from a periphery of the cap, the deformable lip including a second sealing portion, the stem being displaceable relative to the deformable lip along the longitudinal axis of the stem to open the first sealing portion and close the second sealing portion of the deformable lip by deformation of the lip in a first direction of the displacement to allow fluid to move through the passageway in the cap.

2. The valve of claim 1, wherein deformation of the deformable lip caused by axial displacement of the stem relative to the lip provides a restoring force against the axial displacement of the stem to close the first sealing portion and open the second sealing portion of the deformable lip by deformation of the lip in a second direction of the displacement.

3. The valve of claim 1, wherein the first sealing portion of the stem extends radially from the stem and is more rigid than the deformable lip.

4. The valve of claim 3, wherein the first sealing portion extending radially from the stem has a geometry that makes the first sealing portion more rigid that the deformable lip.

5. The valve of claim 1, the first sealing portion having a diameter, the deformable lip having a diameter, wherein the diameter of the first sealing portion is less than the diameter of the deformable lip.

6. The valve of claim 1, the cap further comprising:

a third sealing portion spaced apart from the second sealing portion engageable when during axial displacement of the stem relative to the lip.

7. The valve of claim 6, wherein the cap is made from a deformable material.

8. The valve of claim 1, the passageway including a first opening and a second opening, the first and second openings being located in the cap.

9. The valve of claim 1, the passageway including a first opening and a second opening, the first opening being located in the stem, and the second opening being located in the cap.

10. An apparatus for storing fluid comprising:

a container, portions of the container defining a hole; and a valve seated in the hole, the valve including:

a stem including a first sealing portion, the stem having a longitudinal axis;

a cap connected to the stem, the cap including a passageway; and a deformable lip extending from a periphery of the cap, the deformable lip including a second sealing portion, the stem being displaceable relative to the deformable lip along the longitudinal axis of the stem to open the first sealing portion and close the second sealing portion of the deformable lip by deformation of the lip in a first direction of the displacement to allow fluid to move through the passageway in the cap.

11. The apparatus of claim 10, the container including a wall, wherein the second sealing portion of the deformable lip deforms and contacts the wall of the container when the stem is displaced along the longitudinal axis.

12. The apparatus of claim 10, the container including a wall and a tubular portion extending from the wall of the container, wherein the second sealing portion is in contact with an inside of the tubular portion when the stem is displaced along the longitudinal axis.

13. The apparatus of claim 10, wherein the container is an inkjet cartridge and the fluid is an ink.

14. The apparatus of claim 10, wherein the first sealing portion of the stem extends radially from the stem and is more rigid than the deformable lip.

15. The apparatus of claim 10, the first sealing portion having a diameter, the deformable lip having a diameter, wherein the diameter of the first sealing portion is less than the diameter of the deformable lip.

16. The apparatus of claim 10, the passageway including a first opening and a second opening, the first and second openings being located in the cap.

17. The apparatus of claim 10, the passageway including a first opening and a second opening, the first opening being located in the stem, and the second opening being located in the cap.

18. A method of controlling fluid flow comprising:

providing a container, portions of the container defining a hole;

providing a valve seated in the hole, the valve including:

a stem including a first sealing portion, the stem having a longitudinal axis;

a cap connected to the stem, the cap including a passageway; and a deformable lip extending from a periphery of the cap, the deformable lip including a second sealing portion, the stem being displaceable relative to the deformable lip along the longitudinal axis of the stem to open the first sealing portion and close the second sealing portion of the deformable lip by deformation of the lip in a first direction of the displacement to allow fluid to move through the passageway in the cap; and displacing the stem relative to the deformable lip along the longitudinal axis of the stem to open the first sealing portion and close the second sealing portion of the deformable lip by deformation of the lip in the first direction of the displacement causing fluid to move through the passageway in the cap.

* * * * *